Feb. 10, 1931.  C. C. HANSEN  1,792,221

HOSE CLAMP

Filed March 1, 1930

INVENTOR.
Charles C. Hansen
BY
HIS ATTORNEY

Patented Feb. 10, 1931

1,792,221

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

HOSE CLAMP

Application filed March 1, 1930. Serial No. 432,398.

This invention relates to clamps, but more particularly to a clamp adapted for securing a flexible conduit to a nozzle or pipe connection.

One object of the invention is to assure a durable and rugged clamp of simplified construction and which may be used in connection with conduits of different diameters.

Other objects will be in part obvious and in part pointed out hereinafter.

Figure 1:
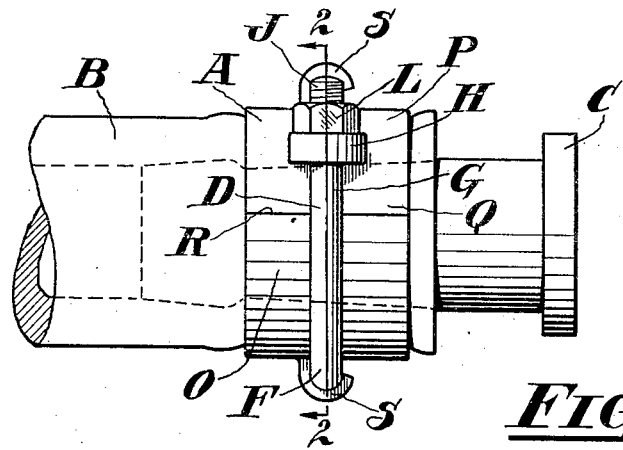
Figure 2:
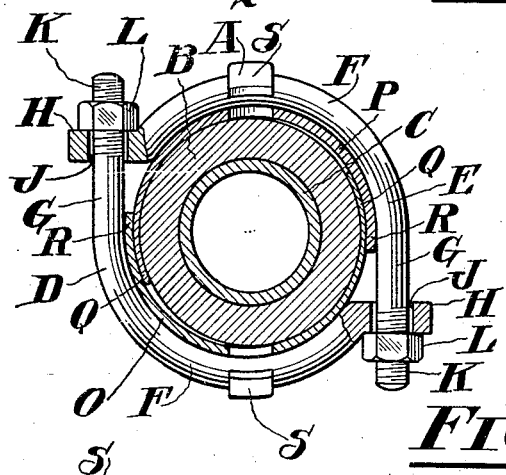
Figure 3:
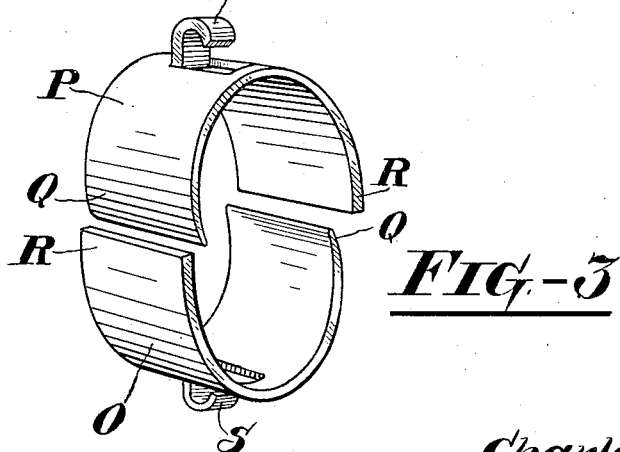

In the accompanying drawings illustrating the invention and in which similar reference characters refer to similar parts, Figure 1 is a side elevation of the clamp showing it applied to a conduit, Figure 2 is a transverse view taken through Figure 1 on the line 2—2 looking in the direction indicated by the arrows, and Figure 3 is a perspective view of a detail.

Referring more particularly to the drawings, the clamp, which is designated generally by A, is shown applied to a conduit B for clamping the conduit to a coupling C.

The clamp comprises a pair of members D and E herein shown as rods or bolts. The members D and E may be symmetrical in all respects and accordingly each is provided with a curved portion F adapted to conform substantially to the contour of the conduit B, and a straight portion G extending tangentially from the portion F. At the free end of each curved portion F is a lateral ear H having an aperture J therein of somewhat larger diameter than that of the straight portions G.

The members D and E are disposed about the conduit B to form a loop and the arrangement is such that the straight portion G of one of the members extends through the aperture J in the ear H of the complementary member. The portions G are threaded as at K to receive nuts L for drawing the members D and E together and thereby exerting a pressure on the conduit B.

In the present instance means are provided for distributing the pressure of the members D and E over a wide area of the conduit B. To this end a pair of plates O and P are disposed about the conduit B to form seats for the members D and E respectively. The plates O and P are preferably identical and are of such length that the end portion R of one plate may overlap the end portion Q of the other plate. The plates may be uniformly tapered from the end portion R to a knife edge on the end portion Q to prevent pinching of portions of the conduit between the plates as the nuts are being tightened to draw the members D and E together.

On each of the plates are formed integral clips or hooks S which project from the outer surfaces of the plates and are suitably curved over the members D and E for holding the members against movement longitudinally of the plates. The members D and E however may be removed endwise through the hooks S after the members have been mutually separated.

To the end that the clamp may be used on conduits of smaller diameter than those to which the clamp is intended to be normally applied, the members D and E may be formed of a suitable flexible material to permit bending of the members to conform to the contour of such conduits. In the assembling of the clamp on such conduits of smaller diameter, one of the nuts L may be threaded on a straight portion G to the usual depth and the other nut L drawn up tightly on its corresponding portion G, thus drawing any surplus length of the loop entirely through one of the ears H. Assembled in this manner, the surplus length of the members may be cut off in one operation.

I claim:

1. A clamp comprising a pair of members cooperating to form a loop around a conduit, a nut threaded on each member and acting against the other member to draw said members together, and a plurality of overlapping plates interposed between the members and the conduit to distribute the pressure of the members to a wide area of the conduit.

2. A clamp comprising a pair of members cooperating to form a loop around a conduit, a nut threaded on each member and acting against the other member to draw said members together, a pair of arcuate plates each having one portion overlapping and another portion overlapped by the other plates interposed between the members and the conduit to distribute the pressure of the members to a wide area of the conduit, and means on the plates engaging the members to prevent displacement of the members on the plates.

3. A clamp comprising a pair of members cooperating to form a loop around a conduit, a nut threaded on each member and acting against the other member to draw said members together, a pair of arcuate plates each having one portion overlapping and another portion overlapped by the other plate interposed between the members and the conduit to distribute the pressure of the members to a wide area of the conduit, the overlapped portion of each plate being of less thickness than the overlapping portion thereof, and hooks integral with the plates to engage the members for holding the members against movement longitudinally of the plates.

4. A clamp comprising a pair of members cooperating to form a loop around a conduit, means on each member acting against the other member for drawing the members together, and a pair of arcuate plates tapered substantially to a knife edge on one side interposed between the members and the conduit, the knife edge portion of each plate being overlapped by the opposite edge of the other plate when the members are drawn together.

In testimony whereof I have signed this specification.

CHARLES C. HANSEN.